United States Patent

Yamakawa

Patent Number: 5,757,534
Date of Patent: May 26, 1998

[54] LIGHT SCANNING OPTICAL SYSTEM AND APPARATUS USING THE SAME

[75] Inventor: Hiromitsu Yamakawa, Omiya, Japan

[73] Assignee: Fuji Photo Optical Co., Ltd, Omiya, Japan

[21] Appl. No.: 861,783

[22] Filed: May 22, 1997

[30] Foreign Application Priority Data

May 28, 1996 [JP] Japan .................... 8-157540

[51] Int. Cl.$^6$ .................................... G02B 26/08
[52] U.S. Cl. .............. 359/205; 359/207; 359/208; 359/216
[58] Field of Search ................. 359/205–208, 359/212–219; 347/258–261; 250/234–236

[56] References Cited

U.S. PATENT DOCUMENTS 4,247,160  1/1981  Brueggemann ............ 359/208

FOREIGN PATENT DOCUMENTS

4-21164  4/1992  Japan .

Primary Examiner—James Phan
Attorney, Agent, or Firm—Ronald R. Snider

[57] ABSTRACT

In a light scanning optical system comprising a first imaging optical system, a deflector, and a second imaging optical system successively toward a surface to be scanned; the second imaging optical system comprises, successively from the deflector side, an imaging lens, a concave cylindrical lens having a power only in a direction substantially orthogonal to the scanning direction, and a negative cylindrical lens having a power only in a direction substantially orthogonal to the scanning direction, in order to reduce the size and cost of apparatus. The light scanning optical system comprises, successively from the light source side, a first lens (1), a deflector (2), second and third lenses (3, 4), a concave cylindrical mirror (5), and a negative cylindrical lens (6). Each of the concave cylindrical mirror (5) and negative cylindrical lens (6) has a power only in a direction orthogonal to the main-scanning direction on a surface (7) to be scanned.

4 Claims, 6 Drawing Sheets

2a; DEFLECTING REFLECTIVE FACE

SURFACE TO BE SCANNED: 7

FIG.3

2a; DEFLECTING REFLECTIVE FACE

7; SURFACE TO BE SCANNED

FIG.4

2a: DEFLECTING REFLECTIVE FACE

SURFACE TO BE SCANNED: 8

FIG.5

2a: DEFLECTING REFLECTIVE FACE

8: SURFACE TO BE SCANNED

LIGHT SCANNING OPTICAL SYSTEM AND APPARATUS USING THE SAME

RELATED APPLICATIONS

This application claims the priority of Japanese Patent Application No.8-157540 filed on May 28, 1996, which is incorporated herein by reference.

BACKGROUND OF THE INVENTION

1. Field of the Invention

The present invention relates to a light scanning optical system and a light scanning apparatus using the same and, in particular, to a light scanning optical system having a function for correcting pitch fluctuations occurring due to face-tilting of a deflector when a luminous flux emitted from a light source is reflected and deflected by the deflector so as to scan a surface to be scanned, and a light scanning apparatus using this optical system.

2. Description of Prior Art

There have conventionally been known light scanning apparatus such as laser printer and laser platemaker in which a surface to be scanned such as a photosensitive material is scanned with a light beam such as laser beam so as to form an image on the surface. A light scanning optical system used for such a light scanning apparatus comprises a deflector such as a rotary polygon mirror which reflects and deflects the light beam emitted from a light source so as to scan the surface to be scanned and an imaging optical system for imaging the light beam onto the surface to be scanned.

In such a light scanning optical system, when the deflecting reflective face of the deflector is tilted, the imaging position of the light beam varies for each scanning line in the direction orthogonal to the scanning direction on the surface to be scanned, thereby forming a pitch fluctuation in the scanning line. In this case, favorable images may not be obtained. Accordingly, known are various kinds of light scanning optical systems having a function for correcting the face-tilting of the deflector. For example, it has been known to place a convex cylindrical mirror between the deflector and the surface to be scanned, so as to utilize the power of the concave cylindrical mirror in the scanning pitch direction to correct the pitch fluctuation occurring due to the face-tilting.

In this light scanning optical system, however, the optical system increases its size when the distance between the concave cylindrical mirror and the surface to be scanned is relatively small, whereas the optical performance such as image surface curvature may remarkably deteriorate when the distance between the concave cylindrical mirror and the surface to be scanned is relatively large.

Therefore, known is a light scanning optical system (disclosed in Japanese Patent Publication No. 4-21164) which comprises, successively from the side of the deflecting reflective face of the deflector, an imaging lens, a negative cylindrical lens having a power only in a direction orthogonal to the surface to be scanned, and a concave cylindrical lens having a power only in a direction orthogonal to the surface to be scanned, thereby overcoming the shortcomings occurring due to the large distance between the concave cylindrical mirror and the surface to be scanned, preventing the optical performance from deteriorating due to the image surface curvature, and reducing the size of the optical system.

In the light scanning optical system disclosed in Japanese Patent Publication No. 4-21164, however, though the optical system can be made smaller than that comprising the concave cylindrical mirror alone, it is not always sufficient in terms of reducing the size of the optical system.

Also, in the prior art mentioned above, since the distance between the negative cylindrical lens and the surface to be scanned is large, it is necessary for a lens with a high precision to be used for accurately imaging the light beam onto the surface to be scanned. Accordingly, the manufacturing cost of the light scanning apparatus may increase when such an optical system is used.

Further, in practice, the optical system is used as being accommodated in a housing, while a window is formed at a predetermined position in a wall of the housing in order to take out the light beam to the outside. In the above-mentioned prior art, in order to prevent dust from entering the inside of the housing from the window, a transparent member such as glass has to be attached to the window, thereby increasing the number of parts of the light scanning optical system.

SUMMARY OF THE INVENTION

In view of such circumstances, it is an object of the present invention to provide a light scanning system which can reduce the size and cost of the optical system and decrease the number of parts therein.

It is another object of the present invention to provide a light scanning apparatus using this optical system.

The light scanning optical system in accordance with the present invention comprises a light source; a first imaging optical system for linearly imaging a luminous flux from the light source; a deflector which has a deflecting reflective face at or near an imaging position of the first imaging optical system and reflects and deflects the luminous flux so as to effect main-scanning on a surface to be scanned; and a second imaging optical system for imaging the luminous flux thus reflected and deflected by the deflector onto the surface to be scanned;

wherein the second imaging optical system comprises, successively from the side of the deflecting reflective face, an imaging lens for imaging the reflected and deflected luminous flux onto the surface to be scanned within a main-scanning plane; a concave cylindrical mirror which is disposed between the imaging lens and the surface to be scanned and has a power only in a direction substantially orthogonal to the main-scanning plane; a negative cylindrical lens which is disposed between the concave cylindrical mirror and the surface to be scanned and has a power only in a direction substantially orthogonal to the main-scanning plane; and wherein, in a plane substantially orthogonal to the main-scanning plane, the deflecting reflective face and the surface to be scanned is placed in an optically conjugate relationship with each other.

Preferably, the cross-sectional form of at least one end face of the negative cylindrical lens on the main-scanning plane is made of a predetermined aspheric surface and, near the optical axis of the negative cylindrical lens, the negative cylindrical lens has substantially zero power in the main-scanning direction while having a predetermined negative power in a direction substantially orthogonal to the main-scanning direction.

The light scanning apparatus in accordance with the present invention comprises the above-mentioned light scanning optical system in accordance with the present invention.

3

Here, "main-scanning plane" refers to a plane formed by a locus of a deflected light beam.

DESCRIPTION OF THE PREFERRED EMBODIMENTS

In the following, embodiments of the present invention will be explained with reference to attached drawings.

Figure 1:
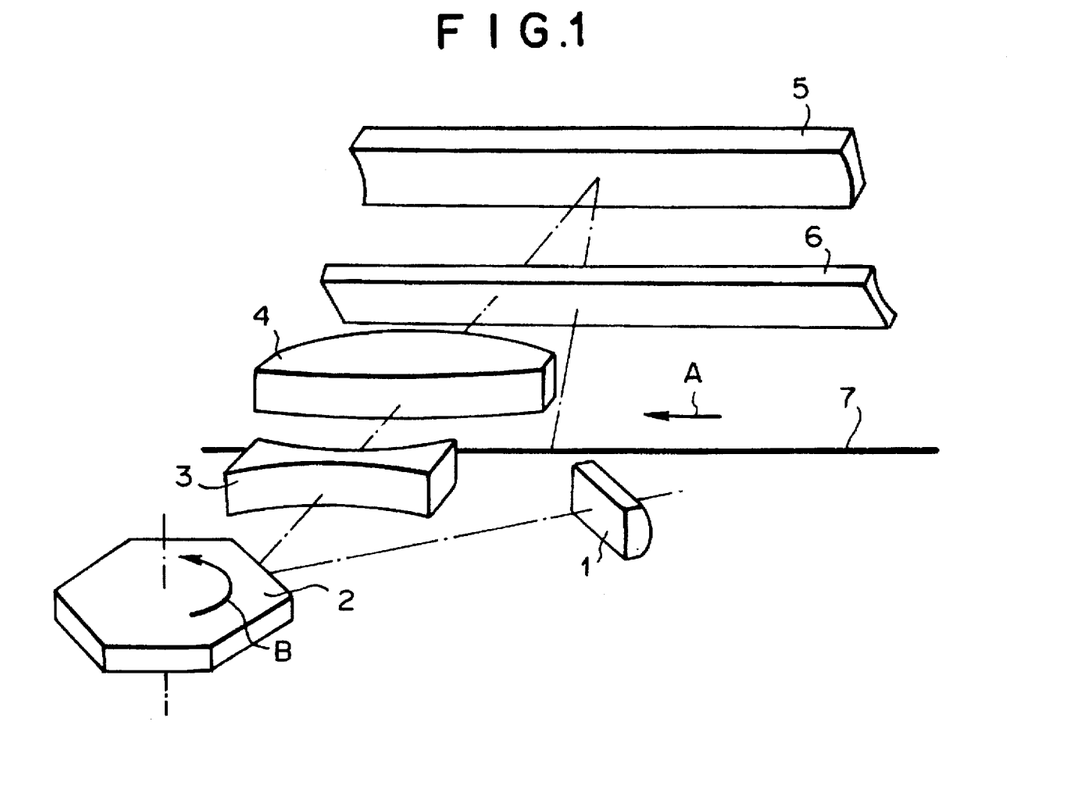
FIG. 1 is a perspective view showing the configuration of the light scanning optical system in accordance with an embodiment of the present invention.

FIG. 1 is a perspective view showing the configuration of the light scanning optical system in accordance with an embodiment of the present invention. As shown in this drawing, the light scanning optical system in accordance with this embodiment comprises a first lens 1 for linearly imaging a light beam emitted from a non-depicted light source; a deflector (rotary polygon mirror) 2 which has a deflecting reflective face near the imaging position of the first lens 1 and reflects and deflects the light beam such that it is scanned on a surface 7 to be scanned; second and third lenses 3 and 4 for imaging the light beam reflected and deflected by the deflector 2 onto the surface 7 to be scanned within a main-scanning plane; a concave cylindrical mirror 5 for reflecting the light beam transmitted through the second and third lenses 3 and 4 toward the surface 7 to be scanned; and a negative cylindrical lens 6 disposed downstream of the concave cylindrical mirror 5.

In FIG. 1, the first lens 1 constitutes a first imaging optical system; whereas the second and third lenses 3 and 4, the concave cylindrical mirror 5, and the negative cylindrical lens 6 constitute a second imaging optical system. While the light beam emitted from the non-depicted light source forms an image on the surface 7 to be scanned, it is subjected to main-scanning in a direction indicated by arrow A on the surface 7 to be scanned as the deflector 2 rotates in a direction indicated by arrow B.

Here, the second lens 3 is a biconcave lens (on the main-scanning plane), whereas the third lens 4 is a biconvex lens or plane-convex lens (on the main-scanning plane). Also, each of the concave cylindrical mirror 5 and negative cylindrical lens 6 has a power only in a direction orthogonal to the main-scanning direction on the surface 7 to be scanned.

4

In the following, Embodiments 1 to 3 of such a light scanning optical system will be explained with reference to their specific values.

(EMBODIMENT 1)

Figure 2:
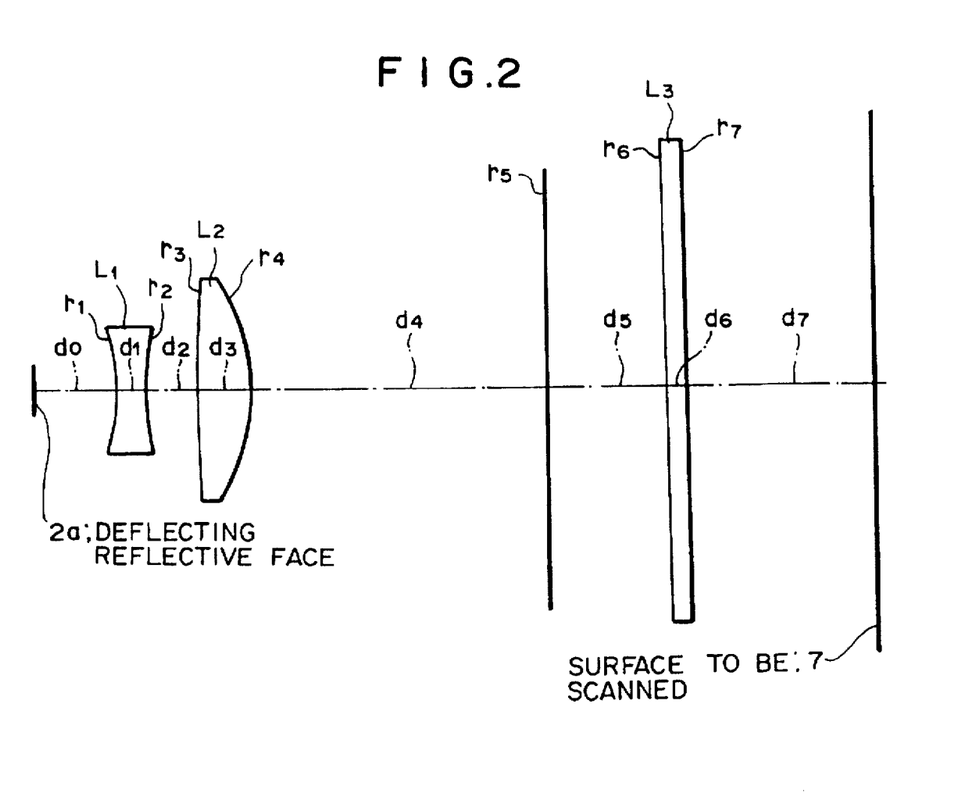
FIG. 2 is a development of an optical system showing a basic configuration of Embodiments 1 and 2 of the present invention on a plane in parallel with its main-scanning plane.
Figure 3:
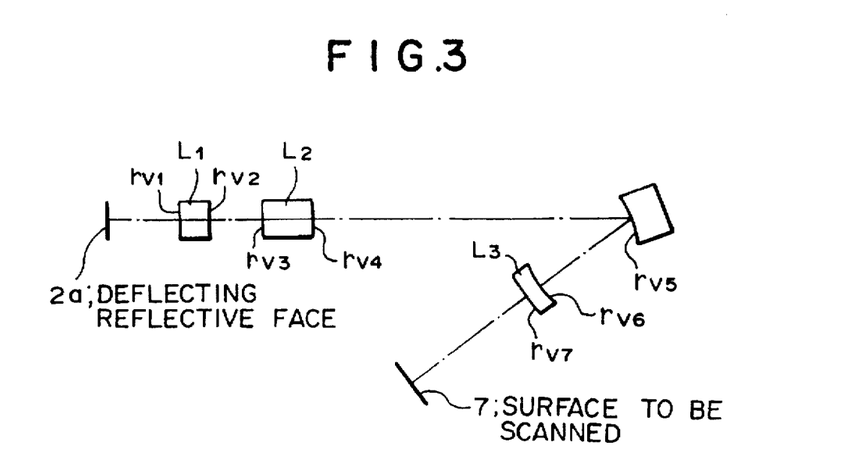
FIG. 3 is a view showing a basic configuration of Embodiments 1 and 2 of the present invention on a plane perpendicular to the main-scanning plane.

FIG. 2 is a development (in which the optical axis is depicted as a single line) of an optical system showing a basic configuration of Embodiment 1 on a plane in parallel with its main-scanning plane; whereas FIG. 3 is a view showing a basic configuration of Embodiments 1 on a plane including its optical axis, perpendicular to the main-scanning plane. Here, FIGS. 2 and 3 show only the second imaging optical system disposed downstream of the deflector 2.

As shown in FIGS. 2 and 3, the light scanning optical system in this embodiment comprises, successively from the side of a deflecting reflective face $2a$ of the deflector 2, the second and third lenses $L_1$ and $L_2$ (3 and 4), the concave cylindrical mirror 5, and the negative cylindrical lens $L_3$ (6), whereby the luminous flux incident thereon from the side of the deflector 2 forms an image on the surface 7 to be scanned.

Table 1 (follows) shows radii of curvature r and r (expressed by mm; r being the radius of curvature on a plane in parallel with the main-scanning plane; r being the radius of curvature on a plane perpendicular to the main-scanning plane) of each lens surface, thickness of each lens or air gap between neighboring lenses d (mm), and refractive index n of each lens at 780 nm. Here, the lower part of Table 1 shows distance $d_0$ from the deflecting reflective face $2a$ of the deflector 2 to the surface of the second lens $L_1$ on the deflector side, focal length f of the whole lens system of this embodiment, back focus Bf, half field angle, and wavelength of the light beam used.

When the light scanning optical system is constituted in this manner, the imaging magnification in the direction of a plane orthogonal to the main-scanning plane between the deflecting reflective face $2a$ of the deflector 2 and the surface 7 to be scanned becomes greater than that in the case where the negative cylindrical lens and the concave cylindrical mirror are disposed successively from the deflector side as disclosed in the above-mentioned Japanese Patent Publication No. 4-21164.

Since the focal length of the first imaging optical system for converging the light beam at or near the deflecting reflective face $2a$ of the deflector 2 is inversely proportional to the imaging magnification in the direction orthogonal to the main-scanning plane between the deflecting reflective face $2a$ and the surface 7 to be scanned, the focal length of the first imaging optical system can be shortened, whereby the light scanning optical system can be made compact.

In the light scanning optical system of the above-mentioned Japanese Patent Publication No. 4-21164, a window is formed in order to emit a light beam from a housing accommodating the optical system, while it is necessary for the window to be covered with a transparent sheet glass so as to prevent dust from entering the inside of the housing from the window, thereby increasing the number of parts in the apparatus. In this embodiment, since the fourth lens $L_3$ can cover the window, no additional transparent member such as sheet glass is necessary, whereby the number of parts in the apparatus can be reduced.

(EMBODIMENT 2)

Like Embodiment 1, as shown in FIGS. 2 and 3, the light scanning optical system in accordance with Embodiment 2 comprises, successively from the side of the deflecting reflective face 2a of the deflector 2, the second and third lenses $L_1$ and $L_2$ (3 and 4), the concave cylindrical mirror 5, and the negative cylindrical lens $L_3$ (6), whereby the luminous flux incident thereon from the side of the deflector 2 forms an image on the surface 7 to be scanned.

Table 2 (follows) shows the radii of curvature r and r of each lens surface, the thickness of each lens or air gap between neighboring lenses d (mm), and the refractive index n of each lens at 780 nm. In this embodiment, since radius of curvature $r_6$ of the surface of the fourth lens $L_3$ on the side of the deflecting reflective face 2a is a high-order function of an aspheric surface, the middle part of Table 2 shows an aspheric surface expression and its aspheric surface data. Also, the lower part of Table 2 shows the distance $d_0$ from the deflecting reflective face 2a of the deflector 2 to the surface of the second lens $L_1$ on the deflector side, the focal length f of the whole lens system of this embodiment, the back focus Bf, the half field angle, and the wavelength of the light beam used.

As mentioned above, in the present invention, since the negative cylindrical lens can be disposed at a position closer to the surface to be scanned as compared with the light scanning optical system disclosed in the above-mentioned Japanese Patent Publication No. 4-21164, the surface precision required for the negative cylindrical lens can relatively be lowered. Thus, as in Embodiment 2, a plastic lens can be used as the fourth lens $L_3$, whereby the cost of the apparatus can be lowered.

In the light scanning optical system disclosed in the above-mentioned Japanese Patent Publication No. 4-21164, since only the spherical lenses whose cross-sectional form on the main-scanning plane is an arc are used, it is difficult to accurately attain a constant velocity of the light beam in the main-scanning direction. Accordingly, when an image with a high accuracy should be formed, it is necessary for the signal used for modulating the light beam to be electrically corrected. In the light scanning optical system in accordance with Embodiment 2, since the cross-sectional form of the fourth lens $L_3$ on the main-scanning plane is made as an aspheric surface, a constant scanning velocity can be attained accurately in the light beam on the surface to be scanned, thereby making the electric correction means for modulating the light beam unnecessary.

(EMBODIMENT 3)

Figure 4:
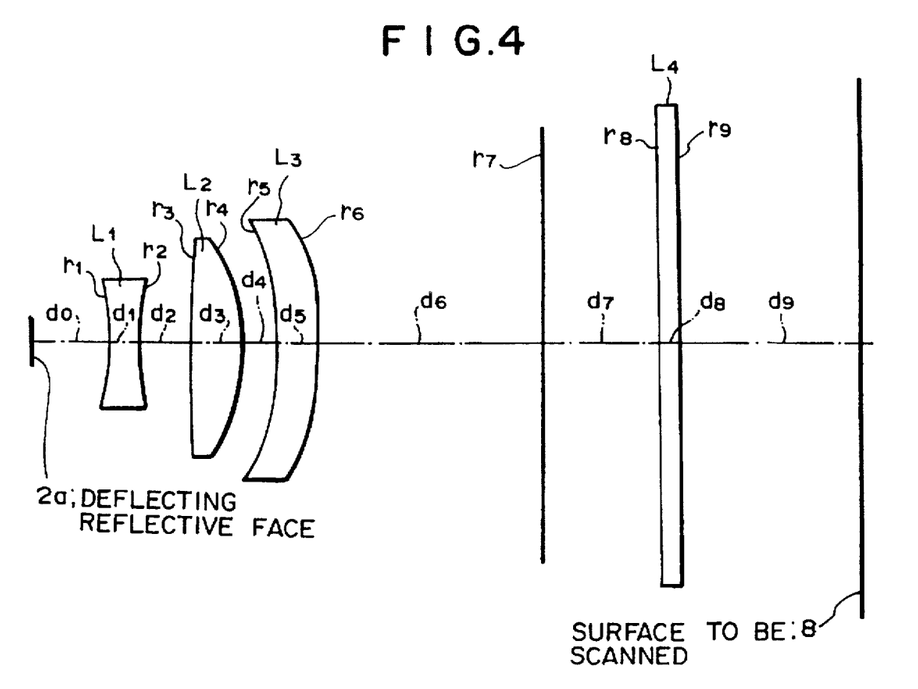
FIG. 4 is a development of an optical system showing a basic configuration of Embodiment 3 of the present invention on a plane in parallel with its main-scanning plane.
Figure 5:
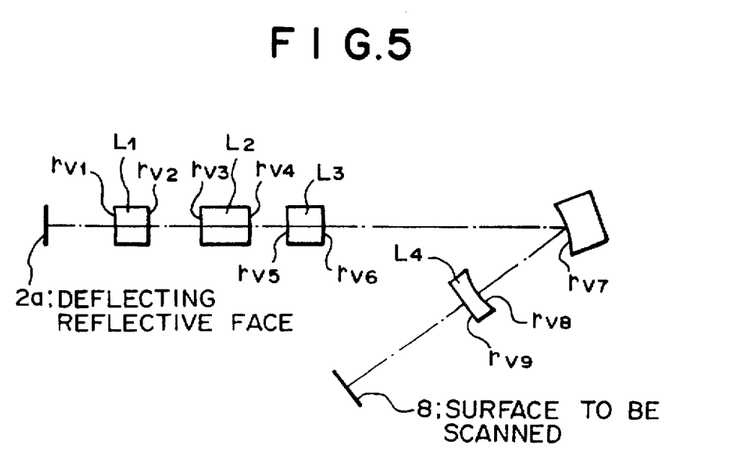
FIG. 5 is a view showing a basic configuration of Embodiment 3 of the present invention on a plane perpendicular to the main-scanning plane.

FIG. 4 is a development (in which the optical axis is depicted as a single line) of an optical system showing a basic configuration of Embodiment 3 on a plane in parallel with its main-scanning plane; whereas FIG. 5 is a view showing a basic configuration of Embodiment 3 on a plane including its optical axis, perpendicular to the main-scanning plane. Here, FIGS. 4 and 5 show only the second imaging optical system disposed downstream of the deflector 2.

The light scanning optical system in accordance with Embodiment 3 has a configuration substantially the same as that of the foregoing two embodiments, except that a plastic lens $L_3$ having a low power is disposed between the third lens $L_2$ and the concave cylindrical mirror.

Table 3 (Follows) shows the radii of curvature r and r of each lens surface, the thickness of each lens or air gap between neighboring lenses d (mm), and the refractive index n of each lens at 685 nm. In this embodiment, since the radius of curvature of each of both surfaces of the fourth lens $L_3$ is a high-order function of an aspheric surface, the middle part of Table 3 shows an aspheric surface expression and its aspheric surface data. Also, the lower part of Table 3 shows the distance $d_0$ from the deflecting reflective face 2a of the deflector 2 to the surface of the second lens $L_1$ on the deflector side, the focal length f of the whole lens system of this embodiment, the back focus Bf, the half field angle, and the wavelength of the light beam used. Further, the focal length f and focal length fa of the fourth lens $L_3$ made of plastic satisfy the following relationship:

$$-0.1 < f/fa < 0.1$$

Since the plastic lens can easily be molded into various shapes, the lens surfaces can have aspheric forms. Accordingly, a constant scanning velocity can be attained accurately in the light beam on a surface 8 to be scanned, thereby making the electric correction means for modulating the light beam unnecessary.

In general, plastic lenses greatly fluctuate in terms of temperature characteristics, whereby the shifting of their imaging position or the like may become problematic. In this embodiment, however, a light scanning system which is not greatly influenced by changes in temperature can be constituted since the absolute value of the focal length fa is made greater than the absolute valuers the focal length f so as to satisfy the expression:

$$-0.1 < f/fa < 0.1$$

Figure 6A:
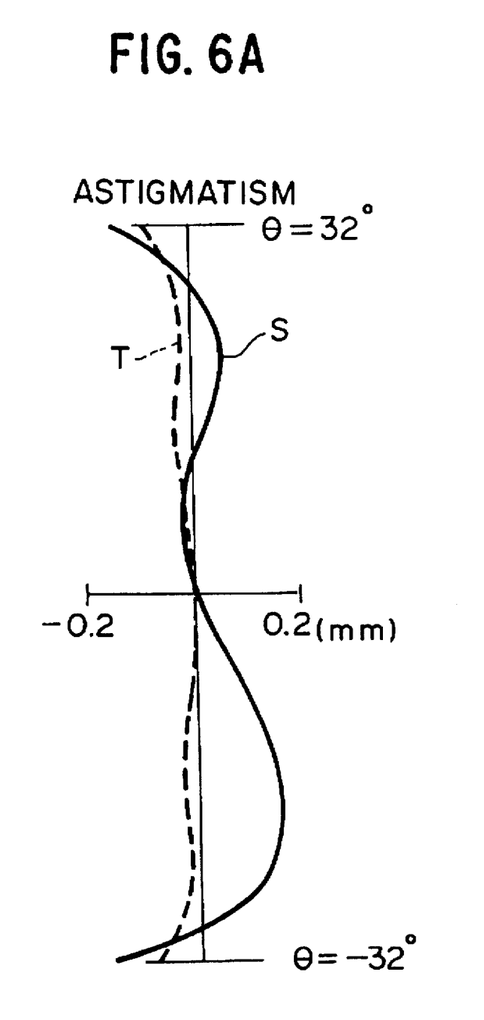
FIG. 6 is an aberration chart of the light scanning optical system in accordance with Embodiment 1.
Figure 6B:
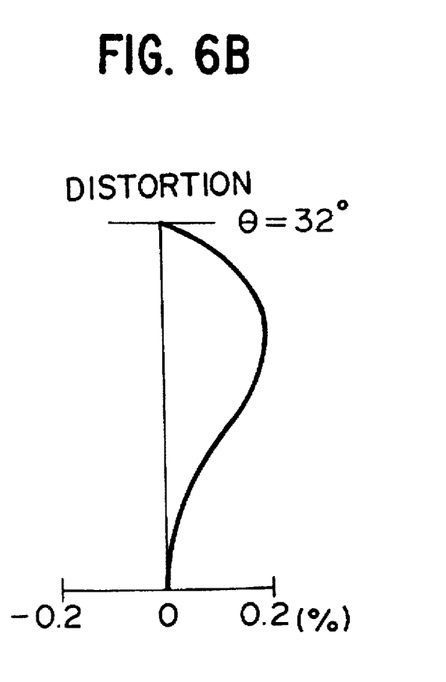
Figure 7A:
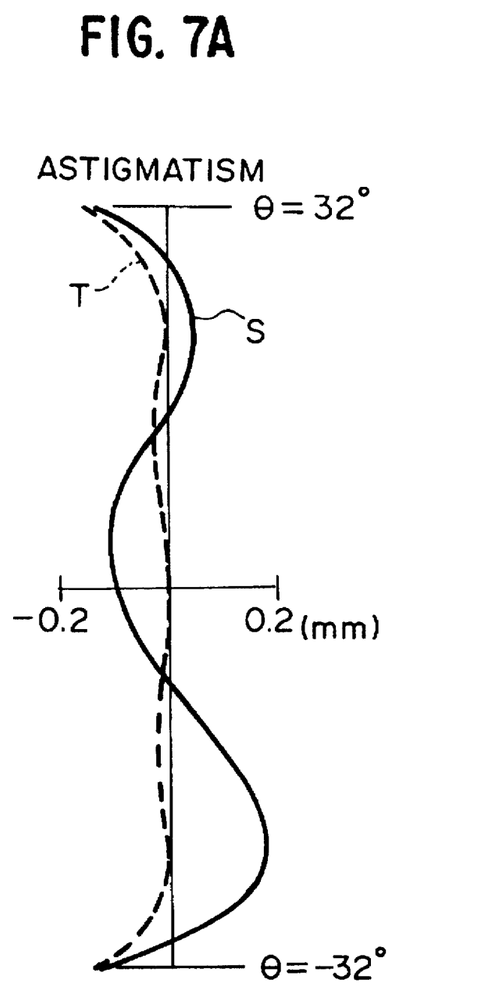
FIG. 7 is an aberration chart of the light scanning optical system in accordance with Embodiment 2.
Figure 7B:
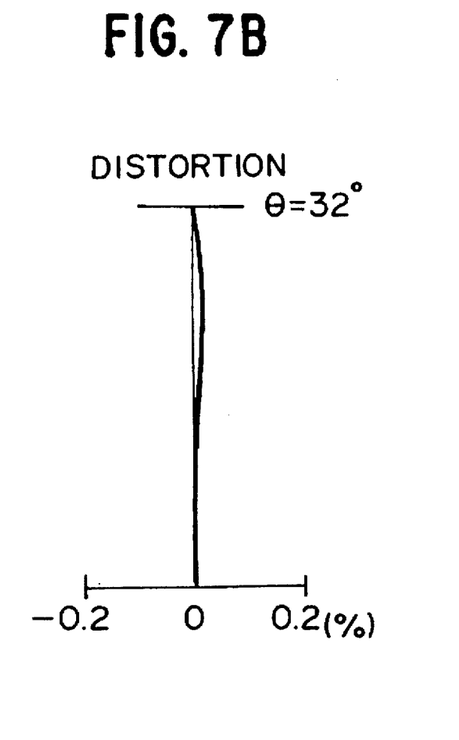
Figure 8A:
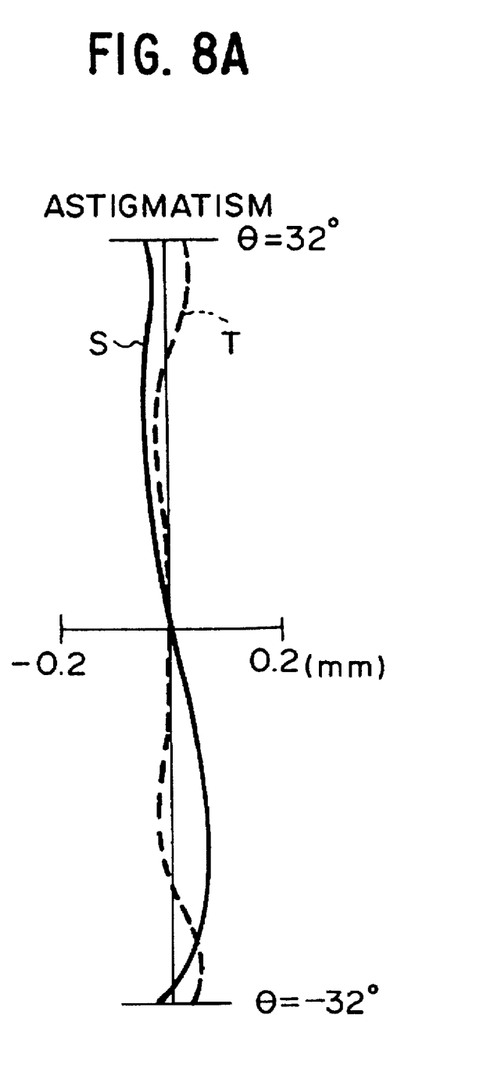
FIG. 8 is an aberration chart of the light scanning optical system in accordance with Embodiment 3.
Figure 8B:
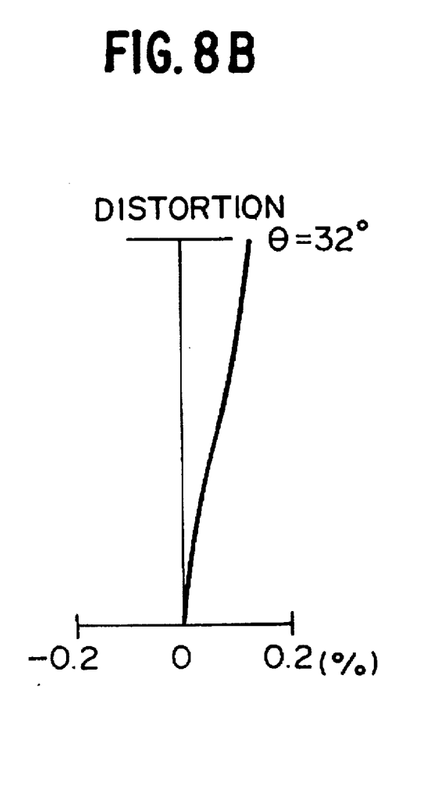

FIGS. 6 to 8 respectively show aberration charts of Embodiments 1 to 3. As can be seen from FIGS. 6 to 8, astigmatism and distortion can be made favorable in accordance with Embodiments 1 to 3. In particular, in Embodiments 2 and 3, as aspheric lenses are used, distortion can be made more favorable.

Here, without being restricted to those of Embodiments 1 to 3, the lens systems constituting the light scanning optical system of the present invention can be modified in various manners. For example, the radii of curvature r and r of each lens and the lens spacing (or lens thickness) d can appropriately be changed.

As explained in detail in the foregoing, in the light scanning optical system of the present invention and the light scanning apparatus using this optical system, as the second imaging optical system for imaging the luminous flux deflected and reflected by the deflector onto the surface to be scanned comprises, successively from the deflector side, an imaging lens, a concave cylindrical mirror having a power only in a direction substantially orthogonal to the scanning direction, and a negative cylindrical lens having a power only in a direction substantially orthogonal to the scanning direction, the distance between the negative cylindrical lens and the surface to be scanned can be made smaller than that in the conventional light scanning optical system comprising the negative cylindrical lens and the concave cylindrical lens in this order. Also, since the focal length of the first imaging optical system for converging the light beam at or near the deflecting reflective face of the deflector is inversely proportional to the imaging magnification in the direction orthogonal to the main-scanning plane between the deflecting reflective face and the surface to be scanned, the focal length of the first imaging optical system can be shortened. Accordingly, the light scanning optical system can be made compact.

Also, while it is desirable that the window for emitting the light beam be covered with a transparent member in order to prevent dust from entering the inside of a housing accommodating the light scanning optical system, since the above-mentioned negative cylindrical lens is disposed at a position where it can also serve as the dust-preventing transparent member, the number of parts can be reduced as compared with the conventional light scanning optical system.

Further, since the negative cylindrical lens can be disposed at a position closer to the surface to be scanned as compared with the conventional light scanning optical system, the surface precision required for the negative cylindrical lens can relatively be lowered. Thus, a plastic lens can be used as the negative cylindrical lens, whereby the cost of the apparatus can be lowered.

Also, as the cross-sectional form of the negative cylindrical lens on the main-scanning plane is shaped into an aspheric surface, a constant scanning velocity can be attained accurately in the light beam on the surface to be scanned, thereby making the electric correction means for modulating the light beam unnecessary.

TABLE 1

| Surface | r | $r_v$ | d | n |
|---|---|---|---|---|
| 1 | −204.450 | −204.450 | 4.996 | 1.71222 |
| 2 | 317.885 | 317.885 | 11.650 | |
| 3 | 1098.885 | 1098.885 | 7.150 | 1.71222 |
| 4 | −51.977 | −51.977 | 58.554 | |
| 5 | ∞ | −60.016 | 15.385 | Reflective face Incident angle 15° |
| 6 | ∞ | −39.604 | 1.923 | |
| 7 | ∞ | ∞ | | 1.51118 |

$d_0 = 10.115$  Half field angle $\theta = 32°$  $f = 100$
Wave length $\lambda = 780$ nm  Bf = 34.615

TABLE 2

| Surface | r | $r_v$ | d | n |
|---|---|---|---|---|
| 1 | −183.367 | −183.367 | 4.996 | 1.71222 |
| 2 | 234.750 | 234.750 | 11.650 | |
| 3 | 547.773 | 547.773 | 7.150 | 1.71222 |
| 4 | −51.147 | −51.147 | 60.273 | |
| 5 | ∞ | −57.515 | 15.385 | Reflective face Incident angle 15° |
| 6 | Aspheric | −30.488 | 1.923 | 1.51939 |
| 7 | ∞ | ∞ | | |

Aspheric surface expression
$$Z = CY^2/(1 + (1 - (1 + K) C^2 Y^2)^{1/2}) + a_4 Y^4 + a_6 Y^6 + a_8 Y^8 + a_{10} Y^{10}$$
C: Curvature of the aspheric surface apex
K: Conical constant
$a_i$: Aspheric surface constant
Y: Height from the optical axis
Z: distance of a point on the aspheric surface from the tangential plane at the lens surface apex
Aspheric surface data

| surface | C | K | $a_4$ | $a_6$ |
|---|---|---|---|---|
| 6 | −0.0 | 1.0 | $1.128593 \times 10^{-8}$ | $-1.845215 \times 10^{-11}$ |

| | | | $a_8$ | $a_{10}$ |
|---|---|---|---|---|
| | | | $-1.142238 \times 10^{-15}$ | $-5.485702 \times 10^{-19}$ |

$d_0 = 9.346$  Half field angle $\theta = 32°$  $f = 100$
Wave length $\lambda = 780$ nm  Bf = 34.613

TABLE 3

| Surface | r | $r_v$ | d | n |
|---|---|---|---|---|
| 1 | −26.222 | −26.222 | 3.846 | 1.71841 |
| 2 | 85.116 | 85.116 | 1.708 | |
| 3 | ∞ | ∞ | 6.923 | 1.71841 |
| 4 | −29.488 | −29.488 | 4.615 | |
| 5 | Aspheric | Aspheric | 5.769 | 1.52215 (Plastic) |
| 6 | Aspheric | Aspheric | 59.613 | |

TABLE 3-continued

| 7 | ∞ | −61.094 | 15.385 | Reflective face Incident angle 15° |
|---|---|---|---|---|
| 8 | ∞ | −71.427 | 3.846 | 1.51347 |
| 9 | ∞ | ∞ | | |

Aspheric surface expression
$$Z = CY^2/(1 + (1 - (1 + K) C^2 Y^2)^{1/2}) + a_4 Y^4 + a_6 Y^6 + a_8 Y^8 + a_{10} Y^{10}$$
C: Curvature of the aspheric surface apex
K: Conical constant
$a_i$: Aspheric surface constant
Y: Height from the optical axis
Z: distance of a point on the aspheric surface from the tangential plane at the lens surface apex
Aspheric surface data

| Surface | C | K | $a_4$ | $a_6$ |
|---|---|---|---|---|
| 5 | −0.017333 | 6.217049 | $-1.423452 \times 10^{-3}$ | $8.334525 \times 10^{-10}$ |

| | | | $a_8$ | $a_{10}$ |
|---|---|---|---|---|
| | | | $-6.736516 \times 10^{-14}$ | $-1.631867 \times 10^{-18}$ |

| Surface | C | K | $a_4$ | $a_6$ |
|---|---|---|---|---|
| 6 | −0.017333 | 3.963636 | $-9.864287 \times 10^{-6}$ | $1.967124 \times 10^{-9}$ |

| | | | $a_8$ | $a_{10}$ |
|---|---|---|---|---|
| | | | $9.021538 \times 10^{-14}$ | $2.174458 \times 10^{-18}$ |

$d_0 = 9.346$  Half field angle $\theta = 32°$  $f = 100$
Wave length $\lambda = 685$ nm  fa = 8374.5  Bf = 34.615

What is claimed is:

1. A light scanning optical system comprising a light source; a first imaging optical system for linearly imaging a luminous flux from said light source; a deflector which has a deflecting reflective face at or near an imaging position of said first imaging optical system and reflects and deflects said luminous flux so as to effect main-scanning on a surface to be scanned; and a second imaging optical system for imaging the luminous flux thus reflected and deflected by said deflector onto said surface to be scanned;

wherein said second imaging optical system comprises, successively from a side of said deflecting reflective face, an imaging lens for imaging the reflected and deflected luminous flux onto said surface to be scanned within a main-scanning plane; a concave cylindrical mirror which is disposed between said imaging lens and said surface to be scanned and has a power only in a direction substantially orthogonal to said main-scanning plane; a negative cylindrical lens which is disposed between said concave cylindrical mirror and said surface to be scanned and has a power only in a direction substantially orthogonal to said main-scanning plane; and wherein, in a plane substantially orthogonal to said main-scanning plane, said deflecting reflective face and said surface to be scanned is placed in an optically conjugate relationship with each other.

2. A light scanning optical system according to claim 1, wherein a cross-sectional form of at least one end face of said negative cylindrical lens on said main-scanning plane is made of a predetermined aspheric surface and wherein, near an optical axis of said negative cylindrical lens, said negative cylindrical lens has substantially zero power in the main-scanning direction while having a predetermined negative power in a direction substantially orthogonal to said main-scanning direction.

3. A light scanning apparatus comprising the light scanning optical system according to claim 1.

4. A light scanning apparatus according to claim 3, wherein, in said light scanning optical system, a cross-sectional form of at least one end face of said negative cylindrical lens on said main-scanning plane is made of a predetermined aspheric surface and wherein, near an optical axis of said negative cylindrical lens, said negative cylindrical lens has substantially zero power in the main-scanning direction while having a predetermined negative power in a direction substantially orthogonal to said main-scanning direction.

* * * * *